(12) United States Patent
Yoshifuku et al.

(10) Patent No.: US 10,803,756 B2
(45) Date of Patent: Oct. 13, 2020

(54) FLIGHT CONTROLLING APPARATUS, FLIGHT CONTROLLING METHOD, AND NON-TRANSITORY STORAGE MEDIUM

(71) Applicant: SUBARU CORPORATION, Tokyo (JP)

(72) Inventors: Yasuhiro Yoshifuku, Tokyo (JP); Yu Takahashi, Tokyo (JP); Yukinobu Tomonaga, Tokyo (JP); Akitoshi Sakaguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 249 days.

(21) Appl. No.: 15/896,713

(22) Filed: Feb. 14, 2018

(65) Prior Publication Data

US 2018/0286256 A1 Oct. 4, 2018

(30) Foreign Application Priority Data

Mar. 28, 2017 (JP) .................................. 2017-062443

(51) Int. Cl.
*G08G 5/00* (2006.01)
*G05D 1/10* (2006.01)
(Continued)

(52) U.S. Cl.
CPC ........... *G08G 5/0056* (2013.01); *G05D 1/101* (2013.01); *G07C 5/0808* (2013.01); *G08G 5/006* (2013.01);
(Continued)

(58) Field of Classification Search
CPC .................................................. G08G 5/0056
See application file for complete search history.

(56) References Cited

U.S. PATENT DOCUMENTS 9,257,048 B1 2/2016 Offer et al.
9,617,011 B2 * 4/2017 Derenick ............. G06K 9/0063
(Continued)

FOREIGN PATENT DOCUMENTS

JP 07-069299 A 3/1995
JP 2001-328600 A 11/2001
(Continued)

OTHER PUBLICATIONS

Japanese Office Action issued in corresponding Japanese Patent Application No. 2017-062443, dated Dec. 4, 2018, with English Translation.

*Primary Examiner* — Alex C Dunn
(74) *Attorney, Agent, or Firm* — McDermott Will & Emery LLP

(57) ABSTRACT

A flight controlling apparatus includes an information acquiring unit, a point searching unit, a determining unit, and a route changing unit. The information acquiring unit acquires location information of a factor on a ground that possibly influences safety of an aircraft in landing. The point searching unit searches for one or more landing candidate points to prepare for an expected abnormality in the aircraft in flight, on the basis of the location information. The determining unit determines whether the one or more landing candidate points are selected to prepare for the expected abnormality. The route changing unit changes a flight route of the aircraft to cause the one or more landing candidate points to be obtained to prepare for the expected abnormality in a case where the determining unit determines that no landing candidate point is selected to prepare for the expected abnormality.

15 Claims, 5 Drawing Sheets

(51) Int. Cl.
*G08G 5/02* (2006.01)
*G07C 5/08* (2006.01)
*B64C 39/02* (2006.01)

(52) U.S. Cl.
CPC ......... *G08G 5/0013* (2013.01); *G08G 5/0039* (2013.01); *G08G 5/0069* (2013.01); *G08G 5/0086* (2013.01); *G08G 5/025* (2013.01); *B64C 39/024* (2013.01); *B64C 2201/141* (2013.01)

(56) References Cited

U.S. PATENT DOCUMENTS

| | | | |
|---|---|---|---|
| 9,626,874 B1* | 4/2017 | Gupta | G08G 5/0069 |
| 2010/0305781 A1 | 12/2010 | Felix | |
| 2011/0264312 A1 | 10/2011 | Spinelli et al. | |
| 2013/0282208 A1* | 10/2013 | Mendez-Rodriguez | G01S 17/89 701/16 |
| 2014/0288730 A1 | 9/2014 | Fucke et al. | |
| 2015/0226576 A1 | 8/2015 | Felix et al. | |
| 2016/0114905 A1* | 4/2016 | Derenick | G06K 9/0063 701/16 |
| 2017/0160739 A1* | 6/2017 | Soulier | G05D 1/0022 |
| 2017/0197710 A1* | 7/2017 | Ma | G05D 1/0676 |

FOREIGN PATENT DOCUMENTS

| | | |
|---|---|---|
| JP | 2013-528854 A | 7/2013 |
| JP | 2014-181034 A | 9/2014 |
| JP | 5891220 B2 | 3/2016 |

\* cited by examiner

US 10,803,756 B2

FLIGHT CONTROLLING APPARATUS, FLIGHT CONTROLLING METHOD, AND NON-TRANSITORY STORAGE MEDIUM

CROSS-REFERENCE TO RELATED APPLICATIONS

The present application claims priority from Japanese Patent Application No. 2017-062443 filed on Mar. 28, 2017, the entire contents of which are hereby incorporated by reference.

BACKGROUND

The technology relates to a technique of controlling flight of an aircraft, in particular, to a technique useful for causing an aircraft to fly while obtaining a landing point that allows for safe landing to prepare for occurrence of an abnormality.

Techniques for obtaining a safe flight approach route to a landing point in emergency landing of an aircraft have been developed recently, for example, as disclosed in Japanese Patent (JP-B) No. 5891220.

SUMMARY

A technique disclosed in JP-B No. 5891220 involves only determination of a safe flight approach route from a flight route to a landing point. This technique does not allow an aircraft to fly while having a safe emergency landing point to prepare for occurrence of an abnormality during flight.

It is desirable to provide a flight controlling apparatus, a flight controlling method, and a non-transitory storage medium having a flight controlling program that each achieve causing an aircraft to fly favorably while securing a safe landing candidate point to prepare for occurrence of an abnormality during the flight.

An aspect of the technology provides a flight controlling apparatus including an information acquiring unit, a point searching unit, a determining unit, and a route changing unit. The information acquiring unit is configured to acquire location information of a factor on a ground that possibly influences safety of an aircraft in landing. The point searching unit is configured to search for one or more landing candidate points to prepare for an expected abnormality in the aircraft in flight, on the basis of the location information acquired by the information acquiring unit. The determining unit is configured to determine whether the one or more landing candidate points are selected to prepare for the expected abnormality by the point searching unit. The route changing unit is configured to change a flight route of the aircraft to cause the one or more landing candidate points to be obtained to prepare for the expected abnormality in a case where the determining unit determines that no landing candidate point is selected to prepare for the expected abnormality.

An aspect of the technology provides a flight controlling method including: searching for one or more landing candidate points to prepare for an expected abnormality in the aircraft in flight, on the basis of location information of a factor on a ground that possibly influences safety of an aircraft in landing; determining whether the one or more landing candidate points are selected to prepare for the expected abnormality by the searching; and changing a flight route of the aircraft to cause the one or more landing candidate points to be obtained to prepare for the expected abnormality in a case where a determination is made, by the determining, that no landing candidate point is selected to prepare for the expected abnormality.

An aspect of the technology provides a non-transitory storage medium that includes a flight controlling program embodied therein. The flight controlling program causes, when executed by a computer, the computer to implement a method. The method including: searching for one or more landing candidate points to prepare for an expected abnormality in the aircraft in flight, on the basis of location information of a factor on a ground that possibly influences safety of an aircraft in landing; determining whether the one or more landing candidate points are selected to prepare for the expected abnormality by the searching; and changing a flight route of the aircraft to cause the one or more landing candidate points to be obtained to prepare for the expected abnormality in a case where a determination is made, by the determining, that no landing candidate point is selected to prepare for the expected abnormality.

An aspect of the technology provides a flight controlling apparatus including circuitry. The circuitry is configured to acquire location information of a factor on a ground that possibly influences safety of an aircraft in landing, search for one or more landing candidate points to prepare for an expected abnormality in the aircraft in flight, on the basis of the acquired location information, determine whether the one or more landing candidate points are selected to prepare for the expected abnormality, and change a flight route of the aircraft to cause the one or more landing candidate points to be obtained to prepare for the expected abnormality in a case where a determination is made that no landing candidate point is selected to prepare for the expected abnormality.

DETAILED DESCRIPTION

In the following, a description is given of one implementation of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale.

[Configuration]

First, a description is given of a configuration of an unmanned aerial vehicle (UAV) 1 according to one implementation of the technology.

Figure 1:
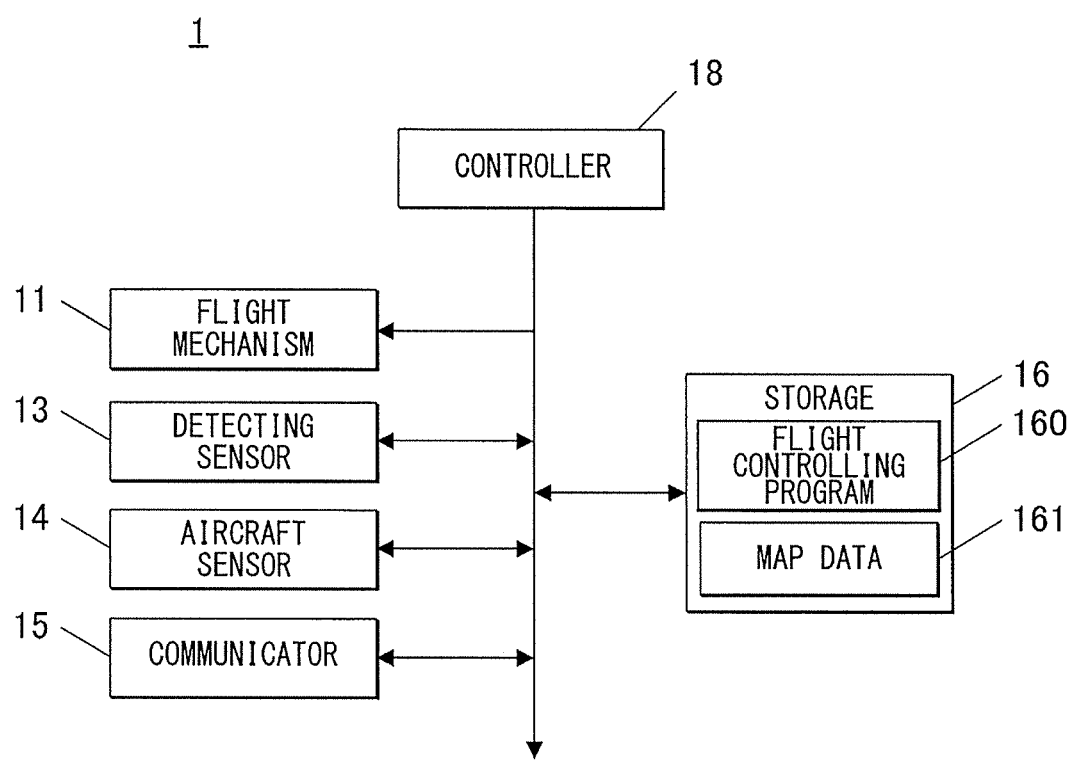
FIG. 1 is a block diagram illustrating an example of a functional configuration of an unmanned aerial vehicle according to an implementation of the technology.

FIG. 1 is a block diagram illustrating an example of a functional configuration of the UAV 1.

The UAV 1 may include a flight controlling apparatus for an aircraft according to one implementation of the technology. The flight controlling apparatus enables the UAV 1 to fly while constantly obtaining landing candidate points that allow for safe landing, to prepare for occurrence of an abnormality and to make a safe and rapid emergency landing in the case of occurrence of an abnormality.

In one implementation, referring to FIG. 1, the UAV 1 may include a flight mechanism 11 that enables the UAV 1 to fly, a detecting sensor 13, an aircraft sensor 14, a communicator 15, a storage 16, and a controller 18. In one implementation, the detecting sensor 13 may serve as an "information acquiring unit". In one implementation, the controller 18 may serve as a "point searching unit", a "determining unit", a "route changing unit", and a "point selecting unit".

The detecting sensor 13 may be a unit directed to identifying a factor on the ground that influences the safety of the UAV 1 in landing, such as an image sensor, radar, or a unit of an image sensor and a radar. The factor on the ground will be described later by referring to a factor element. The detecting sensor 13 may acquire location information of the factor on the ground on the basis of a control instruction given from the controller 18 and may output the acquired location information to the controller 18.

The aircraft sensor 14 may include various sensors directed to detecting a location, a flight state, and other information of the UAV 1. Non-limiting examples of the various sensors may include a gyroscope, a velocity sensor, or a navigation sensor. The aircraft sensor 14 may acquire various pieces of information on the basis of control instructions given from the controller 18 and may output the acquired information to the controller 18.

The communicator 15 may allow for connection to a communication network by means of wireless communication. The communicator 15 may also perform communication with, for example, a ground facility, other aerial vehicle, etc. to allow for transmission and reception of various signals mutually.

The storage 16 may be a memory that stores a program, data, etc. used to achieve various functions of the UAV 1 and that serves as a workspace. The storage 16 of the present implementation may store a flight controlling program 160 and map data 161.

The flight controlling program 160 may cause the controller 18 to execute a flight controlling process which will be described later.

The map data 161 may include comprehensive geographic information including terrain information and information on a utilization state of the land. Examples of the terrain information may include information on a mountain and a river. Examples of the information on the utilization state of the land may include information on a road, a railway, a building, and a farmland.

The controller 18 may centrally control each of units included in the UAV 1. In one implementation, the controller 18 may control the drive of the flight mechanism 11 and thereby control the flight of the UAV 1. The controller 18 may also control operations of the detecting sensor 13 and the aircraft sensor 14. Further, the controller 18 may load the program stored in the storage 16 and thereby execute various processes in association with the loaded program. The controller 18 may also evaluate operation soundness of each of the units included in the UAV 1 to detect an abnormality in each of the units.

[Operation]

A description is given below of operation of the UAV 1 performed upon execution of the flight controlling process.

Figure 2:
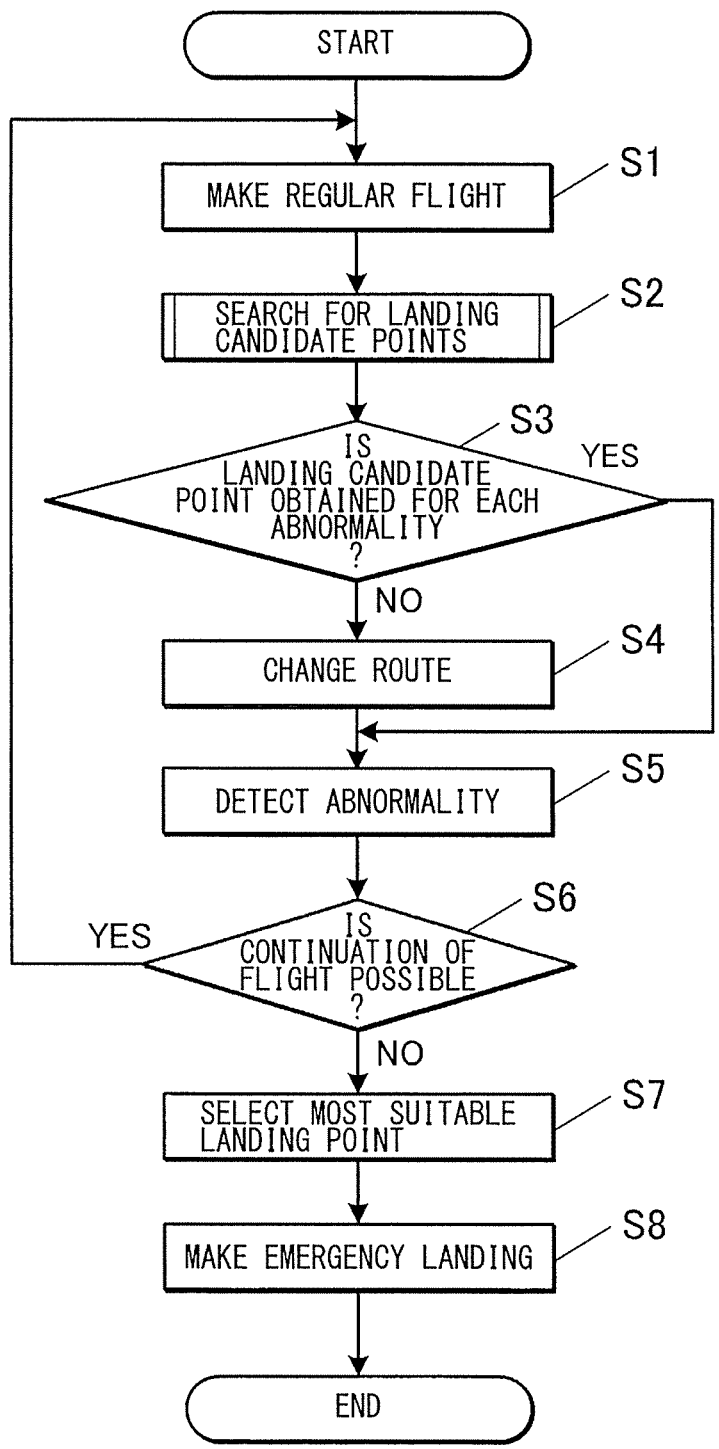
FIG. 2 illustrates an example of a flowchart of a flight controlling process according to the implementation of the technology.
Figure 3:
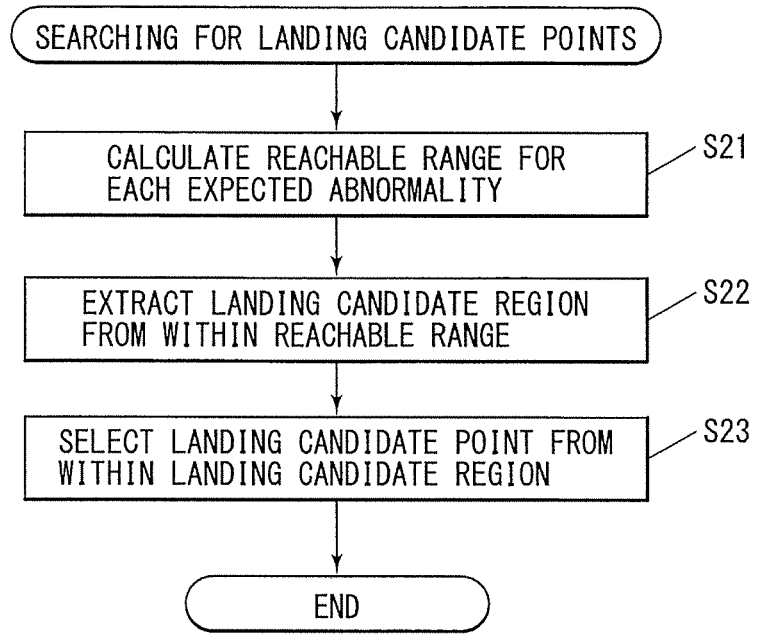
FIG. 3 illustrates an example of a flowchart of landing candidate point search in the flight controlling process illustrated in FIG. 2.
Figure 4:
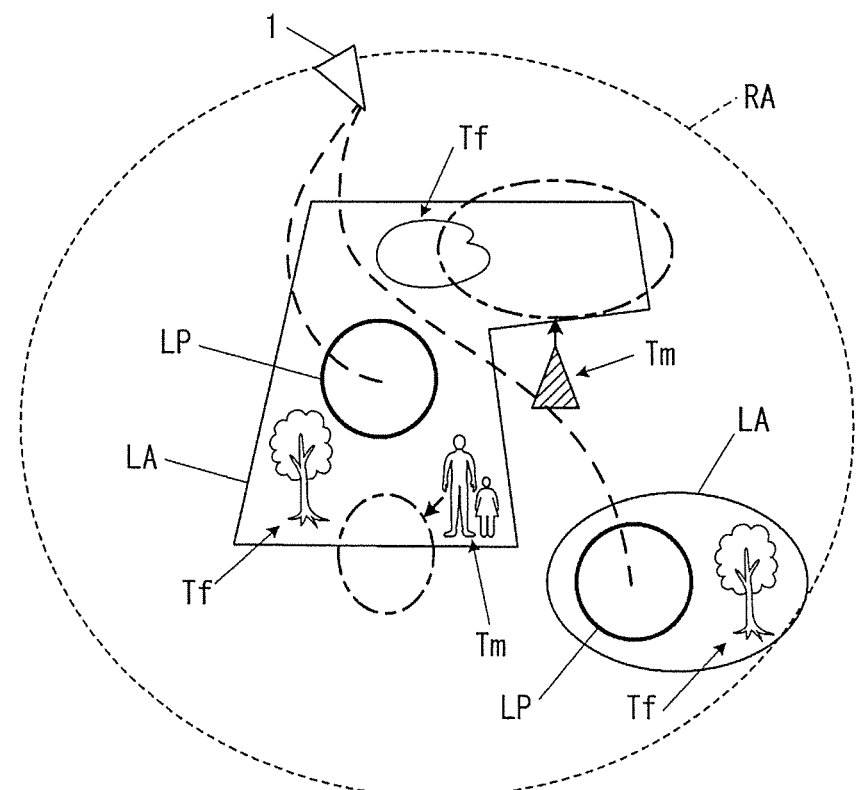
FIG. 4 is a diagram describing an example of the flight controlling process according to the implementation of the technology.

FIG. 2 illustrates an example of a flowchart of the flight controlling process. FIG. 3 illustrates an example of a flowchart of landing candidate point search in the flight controlling process. The landing candidate point search will be described later. FIGS. 4 to 6 are each a diagram that describes an example of the flight controlling process.

The flight controlling process may constantly obtaining landing candidate points to prepare for occurrence of various types of abnormalities, during a normal flight of the UAV 1 in a satisfactory aircraft condition. When an abnormality occurs, the flight controlling process may select a landing candidate point that is expected to be accessible considering the content of the abnormality and make the UAV 1 land safely and rapidly on this landing candidate point. The controlling process may be executed by reading and loading the flight controlling program 160 from the storage 16 by the controller 18, upon reception of an instruction to execute the flight controlling process.

Note that the present implementation is described on the assumption that the UAV 1 is flying along a scheduled flight route.

Referring to FIG. 2, in a situation that the UAV 1 in a sound aircraft state makes a normal flight in satisfactory weather conditions (step S1), the controller 18 may search for multiple landing candidate points LP to prepare for multiple expected abnormalities that may occur in the UAV 1 (step S2) upon the execution of the flight controlling process.

As used herein, the "expected abnormality" may refer to an abnormality in the UAV 1 itself and in circumstances surrounding the UAV 1 that may be expected to occur in future and that may prevent the UAV 1 from continuing flying. Examples of the expected abnormality may include an abnormality in a power system such as a thrust generating mechanism, an abnormality in a flight control system, an abnormality in a guidance system, and an abnormality in a navigation control system, and may also include deterioration of weather conditions.

The process in step S2 may be performed to search for a point on which the UAV 1 is expected to autonomously land safely by a specific future time even when the flight function or other function of the UAV 1 is limited due to one or more of the expected abnormalities. The obtained point may be used as the landing candidate point LP corresponding to any of the expected abnormalities.

In searching for the landing candidate point LP, referring to FIGS. 3 and 4, the controller 18 may first calculate a reachable range RA that is reachable in case of occurrence of each of the expected abnormalities (step S21).

The reachable range RA may be calculated in accordance with the content of the corresponding expected abnormality. For example, an abnormality occurring in the power system may cause limitation mainly in a distance range of the reachable range RA. In another example, an abnormality occurring in the flight control system may cause limitation mainly in a direction of the reachable range RA relative to own location of the UAV 1. In yet another example, an abnormality occurring in the navigation system prevents the UAV 1 from identifying own location, and therefore, the reachable range RA may be mainly set on the basis of a result of detection performed by the detecting sensor 13. In this case, alternatively, a landing candidate region LA or a landing candidate point LP, which is described later, may also be set.

Next, the controller 18 may extract the landing candidate region LA to prepare for each of the expected abnormalities, from within the reachable range RA corresponding to the relevant expected abnormality (step S22).

In one implementation, the controller 18 may extract a geographic range in which the UAV 1 is landable, from within the reachable range RA that is accessible in case of occurrence of each of the expected abnormalities on the basis of the map data 161 and other information. The extracted geographic range may be set as the landing candidate region LA to prepare for the relevant expected abnormality.

The controller 18 may capture a factor element in each of the landing candidate regions LA to select the landing candidate point LP at which the UAV 1 is landable safely, from within each of the landing candidate regions LA (step S23).

In the present implementation, examples of the "factor element" may include objects that should not be damaged by the UAV 1 through contact with the UAV 1 or through other means and may also include obstacles that interfere with the safety of the UAV 1 in landing. For example, the factor element may include a movement factor Tm such as a person, a vehicle, or another aerial vehicle, and a stationary factor Tf such as a building, a tree, or a water place.

These factor elements may be preassigned with respective degrees of influence, which are fixed parameters. The degree of influence may quantify a level of influence of each of the factor elements, i.e., a degree of necessity to avoid contact of the UAV 1 with each of the factors. The manner of evaluating the degree of influence is not particularly limited. For example, a factor element having a higher value from the viewpoint of the social standards may be assigned with a higher value for the degree of influence. Conversely, a factor element that may cause damage almost only to the UAV 1 through contact with the UAV 1 may be assigned with a lower value for the degree of influence. For example, the degree of influence may be set in descending order from a person unrelated to the UAV1, an article such as a building and a vehicle of a person unrelated to the UAV1, other object, a tree, and a water place.

For example, in step S23, the controller 18 may identify and monitor the factor element in each of the landing candidate regions LA by operating the detecting sensor 13 to obtain location information of the factor elements. On the basis of this location information, the controller 18 may select points each having a predetermined value or less of the degree of influence, as the landing candidate points LP. At this time, the controller 18 may estimate a destination of the movement factor Tm by measuring its movement speed and its movement direction and may take the degree of influence of the movement factor Tm into consideration in selecting the landing candidate point LP.

Various pieces of information may be used to select the landing candidate points LP. This information is not limited to one that is obtained by the detecting sensor 13 and may include weather forecast and movement information of other aerial vehicle that are obtained by the communicator 15.

The multiple landing candidate points LP may thus be searched for to prepare for respective expected abnormalities. The controller 18 may associate the multiple landing candidate points LP that are obtained and selected and their degrees of influence, with respective expected abnormalities, and may cause the storage 16 to store these pieces of data or renew data with these pieces of data. At this point of time, the landing candidate points LP may be merely obtained, and therefore, the selected landing candidate points LP may not be necessarily appropriate for use.

Multiple landing candidate points LP may be preferably obtained with respect to each of the expected abnormalities. Each of the landing candidate regions LA and the landing candidate points LP may be used for multiple expected abnormalities that differ from each other.

Thereafter, referring to FIG. 2, the controller 18 may determine whether one or more landing candidate points LP are selected with respect to each of the expected abnormalities (step S3).

If it is determined that one or more landing candidate points LP are selected with respect to each of the expected abnormalities, the determination is YES in step S3, and the controller 18 may proceed to the process in step S5, which will be described later.

Otherwise, if it is determined that one or more landing candidate points LP are not selected with respect to one of the expected abnormalities, that is, if it is determined that there is an expected abnormality for which no available landing candidate point LP is obtained, the determination is NO in step S3. In this case, the controller 18 may change the flight route including the flight altitude of the UAV 1 to cause one or more landing candidate points LP to be obtained with respect to each of the expected abnormalities (step S4).

At this time, the controller 18 may change the flight route to cause one or more landing candidate points LP to be obtained in a reachable range RA on the ground that the UAV 1 is able to reach in a case where any of the expected abnormalities occurs.

Figure 5A:
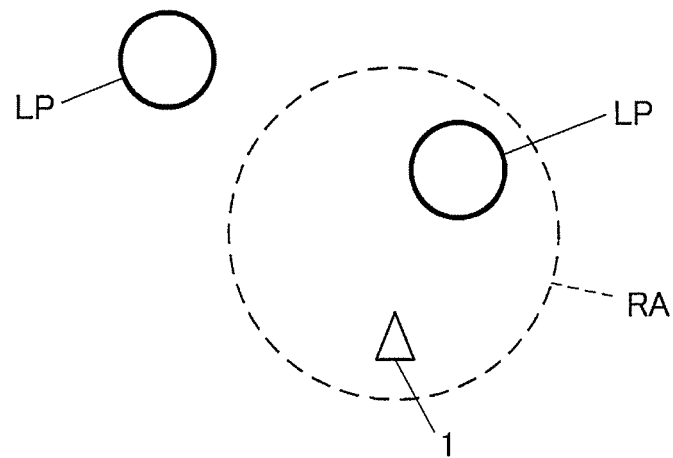
FIGS. 5A to 5C are each a diagram describing an example of the flight controlling process according to the implementation of the technology.
Figure 5B:
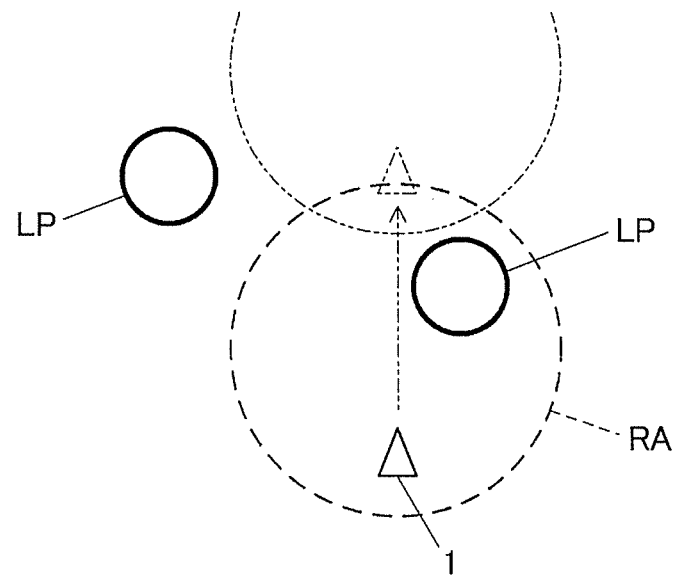
Figure 6:
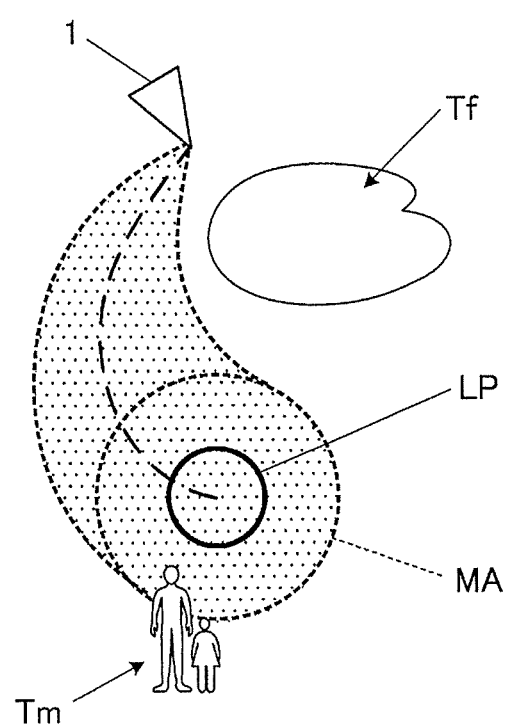
FIG. 6 is a diagram describing an example of the flight controlling process according to the implementation of the technology.

For example, as exemplified in FIG. 5A, the landing candidate point LP may be obtained in the reachable range RA that is accessible in case of occurrence of a specific expected abnormality. Under this condition, when the UAV 1 continues flying along a predetermined flight route, the landing candidate point LP may not be obtained in a future reachable range RA as illustrated in FIG. 5B in some cases.

Figure 5C:
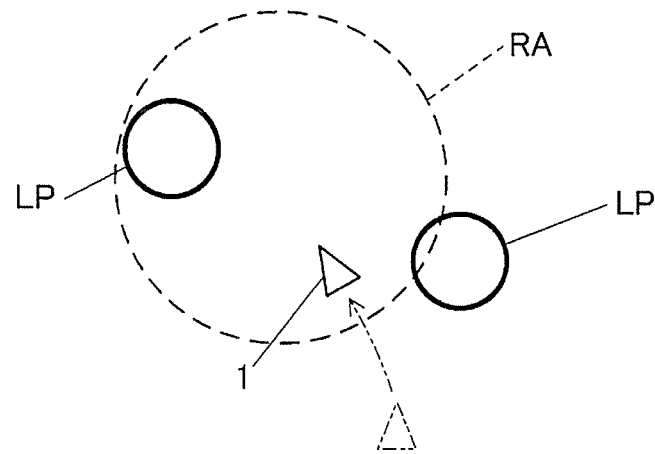

In such a case, it may be determined that one or more landing candidate points LP will not be obtained in the reachable range RA constantly to a predetermined future time. Thus, the controller 18 may change the flight route to cause one or more landing candidate points LP to be obtained in the reachable range RA constantly to the predetermined future time as illustrated in FIG. 5C. The flight route may be changed by an amount as small as possible in one implementation.

As a result, the UAV 1 continues flying while constantly obtaining one or more landing candidate points LP to prepare for each of the expected abnormalities.

Thereafter, referring to FIG. 2, the controller 18 may detect an abnormality in the flight condition, that is, an abnormality in the vehicle body condition or in the surrounding circumstances, of the UAV 1 (step S5). For example, the controller 18 may check operation soundness of each of the units of the own aircraft and may refer to surrounding information acquired by the aircraft sensor 14 or any other unit to determine whether an abnormality occurs in the flight condition of the UAV 1.

Thereafter, the controller 18 may determine the possibility of continuation of flight of the UAV 1 on the basis of the result of the detection obtained in step S5 (step S6). As used herein, the wording "continuation of flight of the UAV 1 is possible" and its variations refer to that the UAV 1 is able to continue its normal flight in a satisfactory flight condition.

If it is determined that the continuation of flight of the UAV 1 is possible, the determination is YES in step S6, and the controller 18 may proceed to the above described process in step S1 to allow the UAV 1 to continue its normal flight. In this case, any abnormality that is detected in step S5 may be acceptable in the condition in which the continuation of flight of the UAV 1 is possible.

Otherwise, if it is determined that the continuation of flight of the UAV 1 is difficult due to occurrence of an abnormality in the UAV 1, the determination is NO in step S6, and the controller 18 may select the most suitable landing point from among the landing candidate points LP that are obtained and selected in advance (step S7).

For example, the controller 18 may read the landing candidate point LP that is selected for the expected abnormality corresponding to the occurring abnormality, from the storage 16 and may select this landing candidate point LP as a landing point. In a case where there are multiple landing candidate points LP that are selected for the expected abnormality corresponding to the occurring abnormality, the controller 18 may select a point having the lowest degree of influence therefrom as the landing point. In another case where there are multiple landing candidate points LP having the same or similar degree of influence, the controller 18 may select a point at which the UAV 1 is able to land at the earliest time, therefrom as the landing point. Examples of this point may include a point that is closest to the current location. Alternatively, the distance from the current location, that is, rapid landing may override the degree of influence in selecting the landing point.

Thereafter, the controller 18 may cause the UAV 1 to land at the selected landing candidate point LP (step S8).

At this time, referring to FIG. 6, the controller 18 may cause the UAV 1 to descend to the landing candidate point LP, which is selected as a landing point, while monitoring a monitoring region MA that is a predetermined region surrounding the selected landing candidate point LP by operating the detecting sensor 13. Thus, the controller 18 may check the safety of the region including the landing candidate point LP and its surroundings while narrowing the sensing range of the detecting sensor 13 to reduce the amount of arithmetic calculation and operational load.

The monitoring region MA may also be used as an emergency evacuation region in the case of entrance of the movement factor Tm, such as a person, in the proximity to the landing candidate point LP. Alternatively, in such a case, a stationary factor Tf may also be used as the emergency evacuation region. This is because the stationary factor Tf, such as a water field, has a degree of influence lower than that of the movement factor Tm, at which damages to a person unrelated to the UAV1 and other objects are avoided, and only the UAV 1 would be damaged.

In the landing operation, an instruction to evacuate from the regions surrounding the landing candidate point LP may be issued to the surroundings of the selected landing candidate point LP by means of an alarm sound or by other means in one implementation. The alarm sound for evacuation instruction may be output through a speaker (not illustrated) equipped on the own aircraft or through a speaker such as of a public facility via the communicator 15, for example.

Example Effects

The advantageous effects of the flight controlling apparatus equipped on the UAV 1 in the present implementation, and the advantageous effects of the flight controlling method and the flight controlling program used in the flight controlling apparatus, will be described.

Unmanned aerial vehicles that autonomously fly or fly by remote control have rapidly spread for various kinds of purposes in various kinds of fields in recent years.

Upon occurrence of a situation that prevents continuation of flight, such as equipment malfunction or deterioration in weather conditions, during flight of such an unmanned aerial vehicle, the UAV must be landed as rapid as possible while avoiding damaging human bodies and properties of a person unrelated to the UAV1. Safety for such an emergency landing has been typically secured by limiting the flight range of the UAV to a range where a person unrelated to the UAV1 is excluded.

However, the UAV is anticipated to be used in a wider range, and therefore, a technique for enabling a safe emergency landing without damaging a person unrelated to the UAV1 even in a region where a person unrelated to the UAV1 may present is required. Examples of the region may include a riverbed or a park.

Regarding this point, for example, JP-B No. 5891220 describes a technique for determining a flight approach route to a landing point by using various pieces of data, such as obstacle data, traffic data, and population data, while an aircraft is flying. This technique enables obtaining a safe flight approach route to the landing point even in the case of an emergency landing. However, the technique described in JP-B No. 5891220 involves only determination of a safe flight approach route from a flight route to the landing point.

In contrast, in the present implementation, the landing candidate point LP is searched for on the basis of location information of factors on the ground that may influence the safety of the UAV 1 in landing to prepare for the expected abnormality that may occur in the UAV 1 during flight. If no landing candidate point LP is selected to prepare for the expected abnormality, the flight route is changed to cause one or more landing candidate points LP to be obtained with respect to the expected abnormality.

This enables the UAV 1 to fly while obtaining the safe landing candidate point LP to prepare for occurrence of abnormality during the flight.

The factors on the ground are preassigned with respective degrees of influence in accordance with their types to quantify a degree of necessity to avoid contact of the UAV 1 with each of the factors. A point at which the degree of influence is at the predetermined value or less is selected from within the reachable range RA on the ground that the UAV 1 is able to reach in a case where the expected abnormality occurs, as the landing candidate point LP.

Thus, the landing candidate point LP that has a low degree of influence and that enables safe landing is suitably selected.

Furthermore, multiple landing candidate points LP are searched for to prepare for multiple expected abnormalities, and the flight route is changed as necessary to cause one or more landing candidate points LP to be obtained with respect to each of corresponding expected abnormalities.

This enables the UAV 1 to prepare for occurrence of various types of abnormalities and thereby fly safely.

Upon occurrence of an abnormality in the UAV 1, the landing candidate point LP that is preliminarily selected for the expected abnormality corresponding to the occurring abnormality is selected as the landing point.

This eliminates the need for searching for a landable point at the time when the abnormality occurs, and it is only necessary to select the landing point from among the landing candidate points LP that are obtained and selected in advance. As a result, a rapid emergency landing is possible.

In a case where there are multiple landing candidate points LP that are preliminarily selected for the expected abnormality corresponding to the occurring abnormality, the landing candidate point LP that has the lowest degree of influence is selected from among the multiple landing candidate points LP, as the landing point.

This enables an emergency landing at the safest landing point at any time.

[Modifications]

It is to be noted that the technology is not limitedly applicable to the foregoing implementations. It should be appreciated that modifications and alterations may be made by persons skilled in the art without departing from the scope as defined by the appended claims or the equivalents thereof.

For example, the foregoing implementation refers to an example case in which the flight controlling apparatus for an aircraft of the technology is equipped on the UAV 1; however, this is non-limiting. Alternatively, in another implementation, the flight controlling apparatus for an aircraft of the technology may be equipped on a device that remotely controls the aircraft, such as a ground facility.

The controller 18 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 18. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 18 illustrated in FIG. 1.

The invention claimed is:

1. A flight controlling apparatus comprising:
   an information acquiring unit configured to acquire location information of a factor on a ground that possibly influences safety of an aircraft in landing;
   a point searching unit configured to search for one or more landing candidate points to prepare for an expected abnormality in the aircraft in flight, on a basis of the location information acquired by the information acquiring unit;
   a determining unit configured to determine whether the one or more landing candidate points are selected to prepare for the expected abnormality by the point searching unit;
   a route changing unit configured to change a flight route of the aircraft to cause the one or more landing candidate points to be obtained to prepare for the expected abnormality in a case where the determining unit determines that no landing candidate point is selected to prepare for the expected abnormality; and
   a point selecting unit configured to determine, when an abnormality occurs in the aircraft, any of the one or more landing candidate points that are preliminarily selected for the expected abnormality corresponding to the occurring abnormality, as a landing point.

2. The flight controlling apparatus according to claim 1, wherein the route changing unit changes the flight route to cause the one or more landing candidate points to be obtained in a range on the ground that the aircraft is able to reach in a case where the expected abnormality occurs.

3. The flight controlling apparatus according to claim 1, wherein
   the factor is preassigned with a degree of influence in accordance with a type of the factor, the degree of influence being based on quantification of a degree of necessity to avoid contact of the aircraft with the factor, and
   the point searching unit selects, as the landing candidate point to prepare for the expected abnormality, a point at which the degree of influence is at a predetermined value or less from within a range on the ground that the aircraft is able to reach in a case where the expected abnormality occurs.

4. The flight controlling apparatus according to claim 2, wherein
   the factor is preassigned with a degree of influence in accordance with a type of the factor, the degree of influence being based on quantification of a degree of necessity to avoid contact of the aircraft with the factor, and
   the point searching unit selects, as the landing candidate point to prepare for the expected abnormality, a point at which the degree of influence is at a predetermined value or less from within a range on the ground that the aircraft is able to reach in a case where the expected abnormality occurs.

5. The flight controlling apparatus according to claim 1, wherein
   the expected abnormality comprises multiple expected abnormalities,
   the point searching unit searches for multiple landing candidate points to prepare for the multiple expected abnormalities,
   the determining unit determines whether the one or more landing candidate points are selected for each of the multiple expected abnormalities, and
   the route changing unit changes the flight route to cause the one or more landing candidate points to be obtained for each of the multiple expected abnormalities.

6. The flight controlling apparatus according to claim 2, wherein
   the expected abnormality comprises multiple expected abnormalities,
   the point searching unit searches for multiple landing candidate points to prepare for the multiple expected abnormalities,
   the determining unit determines whether the one or more landing candidate points are selected for each of the multiple expected abnormalities, and
   the route changing unit changes the flight route to cause the one or more landing candidate points to be obtained for each of the multiple expected abnormalities.

7. The flight controlling apparatus according to claim 3, wherein
   the expected abnormality comprises multiple expected abnormalities,
   the point searching unit searches for multiple landing candidate points to prepare for the multiple expected abnormalities, the determining unit determines whether the one or more landing candidate points are selected for each of the multiple expected abnormalities, and the route changing unit changes the flight route to cause the one or more landing candidate points to be obtained for each of the multiple expected abnormalities.

8. The flight controlling apparatus according to claim 4, wherein the expected abnormality comprises multiple expected abnormalities, the point searching unit searches for multiple landing candidate points to prepare for the multiple expected abnormalities, the determining unit determines whether the one or more landing candidate points are selected for each of the multiple expected abnormalities, and the route changing unit changes the flight route to cause the one or more landing candidate points to be obtained for each of the multiple expected abnormalities.

9. The flight controlling apparatus according to claim 1, wherein the factor is preassigned with a degree of influence in accordance with a type of the factor, the degree of influence being based on quantification of a degree of necessity to avoid contact of the aircraft with the factor, and the point selecting unit determines, in a case where multiple landing candidate points are preliminarily selected for the expected abnormality corresponding to the occurring abnormality, the landing candidate point that has the lowest degree of influence from among the multiple landing candidate points, as the landing point.

10. The flight controlling apparatus according to claim 2, wherein the factor is preassigned with a degree of influence in accordance with a type of the factor, the degree of influence being based on quantification of a degree of necessity to avoid contact of the aircraft with the factor, and the point selecting unit determines, in a case where multiple landing candidate points are preliminarily selected for the expected abnormality corresponding to the occurring abnormality, the landing candidate point that has the lowest degree of influence from among the multiple landing candidate points, as the landing point.

11. The flight controlling apparatus according to claim 3, wherein the point selecting unit determines, in a case where multiple landing candidate points are preliminarily selected for the expected abnormality corresponding to the occurring abnormality, the landing candidate point that has the lowest degree of influence from among the multiple landing candidate points, as the landing point.

12. The flight controlling apparatus according to claim 4, wherein the point selecting unit determines, in a case where multiple landing candidate points are preliminarily selected for the expected abnormality corresponding to the occurring abnormality, the landing candidate point that has the lowest degree of influence from among the multiple landing candidate points, as the landing point.

13. A flight controlling method comprising:

searching for one or more landing candidate points to prepare for multiple expected abnormalities in an aircraft in flight, on a basis of location information of a factor on a ground that possibly influences safety of the aircraft in landing;

determining whether the one or more landing candidate points are selected for each of the multiple expected abnormalities to prepare for the expected abnormalities by the searching; and changing a flight route of the aircraft to cause the one or more landing candidate points to be obtained for each of the multiple expected abnormalities to prepare for the expected abnormalities in a case where a determination is made, by the determining, that no landing candidate point is selected to prepare for the expected abnormality.

14. A non-transitory storage medium that includes a flight controlling program embodied therein, the flight controlling program causing, when executed by a computer, the computer to implement a method, the method comprising:

searching for one or more landing candidate points to prepare for an expected abnormality in an aircraft in flight, on a basis of location information of a factor on a ground that possibly influences safety of the aircraft in landing;

determining whether the one or more landing candidate points are selected to prepare for the expected abnormality by the searching;

changing a flight route of the aircraft to cause the one or more landing candidate points to be obtained to prepare for the expected abnormality in a case where a determination is made, by the determining, that no landing candidate point is selected to prepare for the expected abnormality; and determining, when an abnormality occurs in the aircraft, any of the one or more landing candidate points that are preliminarily selected for the expected abnormality corresponding to the occurring abnormality, as a landing point.

15. A flight controlling apparatus comprising circuitry configured to acquire location information of a factor on a ground that possibly influences safety of an aircraft in landing, search for one or more landing candidate points to prepare for an expected abnormality in the aircraft in flight, on a basis of the acquired location information, determine whether the one or more landing candidate points are selected to prepare for the expected abnormality, change a flight route of the aircraft to cause the one or more landing candidate points to be obtained to prepare for the expected abnormality in a case where a determination is made that no landing candidate point is selected to prepare for the expected abnormality, and determine, when an abnormality occurs in the aircraft, any of the one or more landing candidate points that are preliminarily selected for the expected abnormality corresponding to the occurring abnormality, as a landing point.

* * * * *